Figure 4:
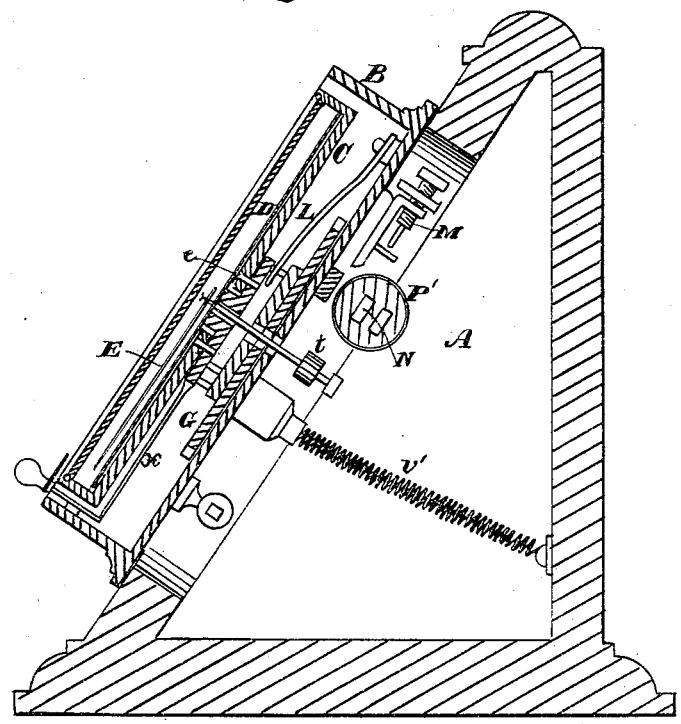
Figure 5:
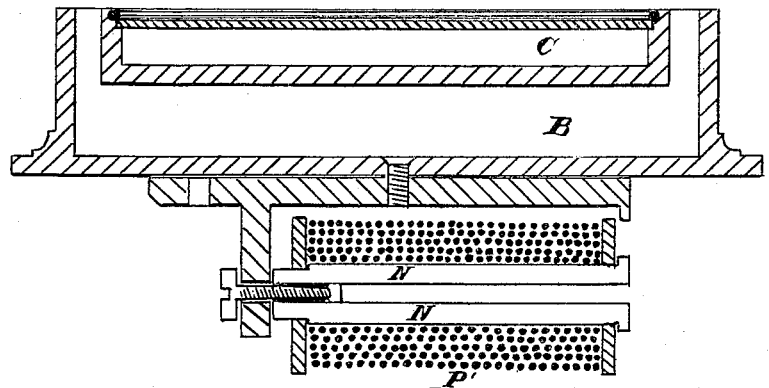

J. C. LUDWIG.
DIAL TELEGRAPH.
No. 181,583. Patented Aug. 29, 1876.
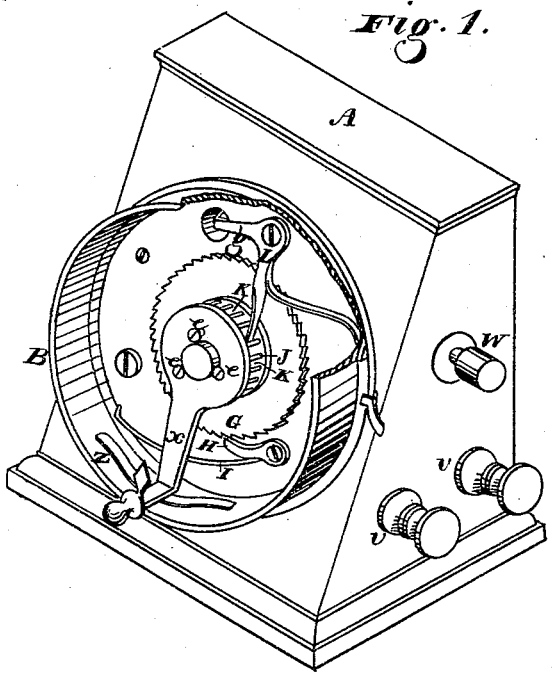
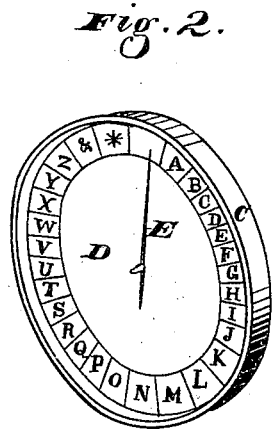
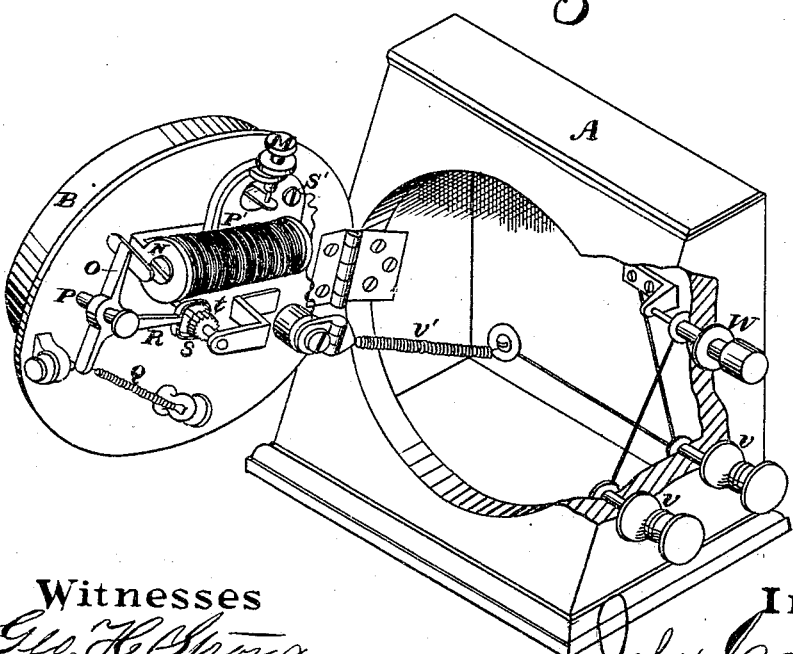
Witnesses
Geo. H. Strong.
Jno. G. Borne.
Inventor
John C. Ludwig
by Dewey & Co.
Attys.

2 Sheets—Sheet 2.

J. C. LUDWIG.
DIAL TELEGRAPH.

No. 181,583. Patented Aug. 29, 1876.

Witnesses
Geo. H. Strong
Jno. L. Bone

Inventor
John C. Ludwig
by Dewey &
his Attorneys.

N. PETERS, PHOTO-LITHOGRAPHER, WASHINGTON, D. C.

UNITED STATES PATENT OFFICE.

JOHN C. LUDWIG, OF SAN FRANCISCO, CALIFORNIA.

IMPROVEMENT IN DIAL-TELEGRAPHS.

Specification forming part of Letters Patent No. 181,583, dated August 29, 1876; application filed July 6, 1876.

*To all whom it may concern:*

Be it known that I, JOHN C. LUDWIG, of San Francisco, in the county of San Francisco and State of California, have invented certain new and useful Improvements in Telegraphic-Dial Instruments, of which the following is a description, which, with the accompanying drawings, is sufficient to enable any person skilled in the art or science to which it most nearly appertains to make and use my said invention without further invention or experiment.

The object of my invention is to provide certain improvements in telegraphic-dial instruments; and it consists of certain details of construction, which will be more fully described by reference to the accompanying drawings, in which—

A is a case, usually made with an inclined upper surface for convenience. Upon this upper inclined face I secure the shallow cylindrical cup B, within which the mechanism is placed, being provided with a cup-shaped cover, C, above or within which is placed the lettered and figured dial D, the operative indicating-hand E, and over these the glass-protecting cover F is secured. The cup-shaped cover C is secured by screws $e$ to the top of a boss or hub which projects upward from the bottom of the cup B, being cast with it; and the disk forming the circuit-breaker is bored so as to fit over this hub, coming up flush with the bottom of the cover C, so that the whole mechanism works between this cover and the bottom of the cup B.

The interior mechanism consists of a circular rotating disk of considerable thickness, the lower part of which is formed into a ratchet, G. The pawl H is held in contact with this ratchet by the spring I, and thus prevents the disk from being rotated backward. Above this ratchet is my break-piece, which consists of alternate projections J and depressions K, or teeth formed around this part of the disk. A bent lever or arm, L, is secured to the bottom of the cup B, and has one end, $g$, bent so as to pass through a hole in the bottom, and stand in front of the screw-stem M, its opposite end resting upon the teeth of the disk, so that, as the disk is turned, the teeth or projections will raise the arm I from the stem M and break the current which is passing through the magnet below. As the disk moves on and the arm falls into the depressions, the contact is again made by allowing the end $g$ to come in contact with M, or any other suitable device may be employed.

The electro-magnet N I place, preferably, upon the lower side of the cup B, as shown, either flatwise or upon edge. The armature is connected by an arm, O, with a pivot-post, P, about which it moves, the tension being regulated by a spring and screw, Q. At the opposite end of the arm O another arm, R, extends out at right angles from the arm O to the center of the bottom of the cup B, and has a detent-pawl, S, at its extremity. This detent operates to turn a pinion, $t$, upon the spindle of the indicator E, which passes up through the cup B and above the dial-plate, and thus each movement of the armature by the action of the circuit-breaker will cause the indicator to move forward.

In order to make the device easily attainable for the purpose of examination or for regulating it, the cup B is hinged at one side and the connection is made with one of the binding-screws V, by means of a spring or other elastic conducting medium, V', while the opposite binding-screw is connected through the hinge with the magnet. If it is desired to set the indicator-hand E to any point, it may be done by the use of a cut-off, W, which connects the binding-screws when operated, without allowing the current to pass through the magnet and its alternate connection and breaking will move the indicator.

The arm X, which is employed to turn the ratchet-disk and break-piece, projects from one side of the disk and extends beneath the cover C and dial to the inside of the rim of the cup B, where a thin plate is turned up, and the operating-knob is placed upon the top. A narrow slot is left all around between the cover C and the rim of the cup to allow this arm to work through the space, and I am thus enabled to make all parts of the mechanism in one place and very compact; and the delicate indicator and card can be protected by a glass not otherwise available. A friction brake or spring, Z, presses against the rim and holds the arm at any point, preventing it from falling back.

The screw-stem S' is mounted upon a brass plate, which is riveted to an insulating plate of rubber or other material, and this insulator is screwed to the bottom of the cup B. By this construction the wire from the magnet to the binding-screw of M is insulated from the plate B.

My magnet is constructed in a novel manner in order to reduce its bulk and allow it to be conveniently attached to the bottom of the cup B. It consists of a single leg, upon which the coil P' is placed, while the other leg passes close to the outside of the coil, and by it the magnet may be screwed to the bottom B. It is in effect an U-magnet, having only one leg provided with a coil; and by this construction I am enabled to bring both poles of my magnet together, which allows the use of a very light armature. This is necessary to make the machine answer promptly.

In order to demagnetize the poles as rapidly as possible after the current is cut off, split that part of the magnet upon which the coil is wound in two parts, so that when the current is flowing through the coil the two halves act as one pole of the magnet; but as soon as the current is cut off, they act as two parts having the same polarity, and consequently repel each other and produce an equilibrium much quicker than when the magnet is a solid piece. By this construction the action of the machine will be much quicker.

Having thus described my invention, what I claim, and desire to secure by Letters Patent, is—

1. The cylindrical cup B, for containing the mechanism, having the central hub F, in combination with the flanged cup-shaped cover C, made smaller than the cup B, so as to allow the operating-arm to project between the two, and at the same time protect the dial D and indicator E by the glass cover, substantially as herein described.

2. The ratchet G, pawl H, rotary circuit-breaker J K, and the operating-arm X, in combination with the cup B and cover C, so united as to permit the the arm X to project between the two, substantially as and for the purpose described.

3. In combination with the circuit-breaker J K, with its operating-arm X, indicator E, and the double cups B C, the arm L, when constructed to make and break connection with the screw-stem M, substantially as herein described.

4. The screw-stem M, with its supporting-plate, when mounted upon the insulating-plate, and secured to the bottom of the cup B, substantially as herein described.

5. The cups B and C, containing the operating mechanism, united as shown, and having the magnet, screw-stem, and escapement for operating the indicator secured to the bottom of the cup B, which is hinged to the supporting-stand A, substantially as and for the purpose herein described.

6. The magnet consisting of the legs and the coil, enveloping one of the legs for the purpose of bringing the poles close together and reducing the size of the armature, substantially as described.

7. The magnet having the leg surrounded by the coil, said leg being divided longitudinally into two parts, substantially as and for the purpose herein described.

8. The containing-cup B, carrying the magnet and operating mechanism, and hinged to the support A, in combination with the elastic or extensible connecting-wire V, so that the device may be operated without breaking the connection, substantially as described.

9. The cut-off W, in combination with the binding-screws U, for the purpose of setting the indicator E to any point, substantially as herein described.

In witness whereof I have hereunto set my hand.

JOHN C. LUDWIG.

Witnesses:
GEO. H. STRONG,
CHARLES G. PAGE.